March 25, 1969
J. E. RAIDEL
3,434,707
SUSPENSIONS
Filed June 2, 1966
Sheet 1 of 3
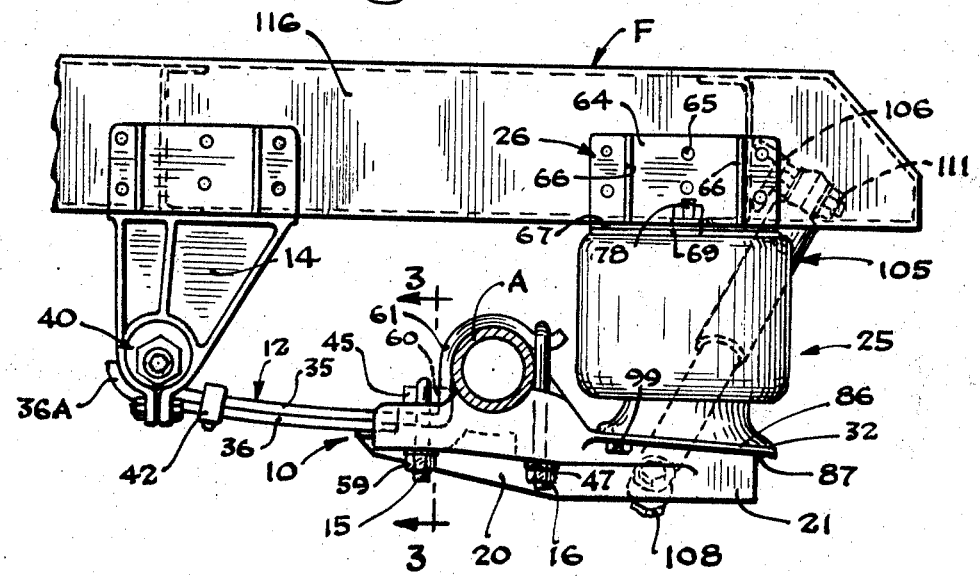
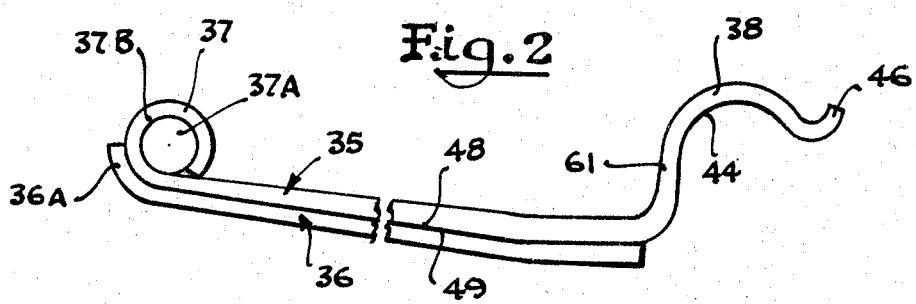
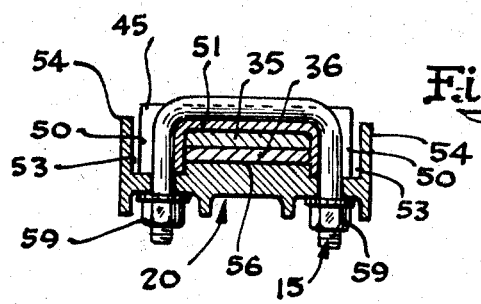
Inventor
John E. Raidel
By Wallace, Kinzer and Dorn
Attorneys

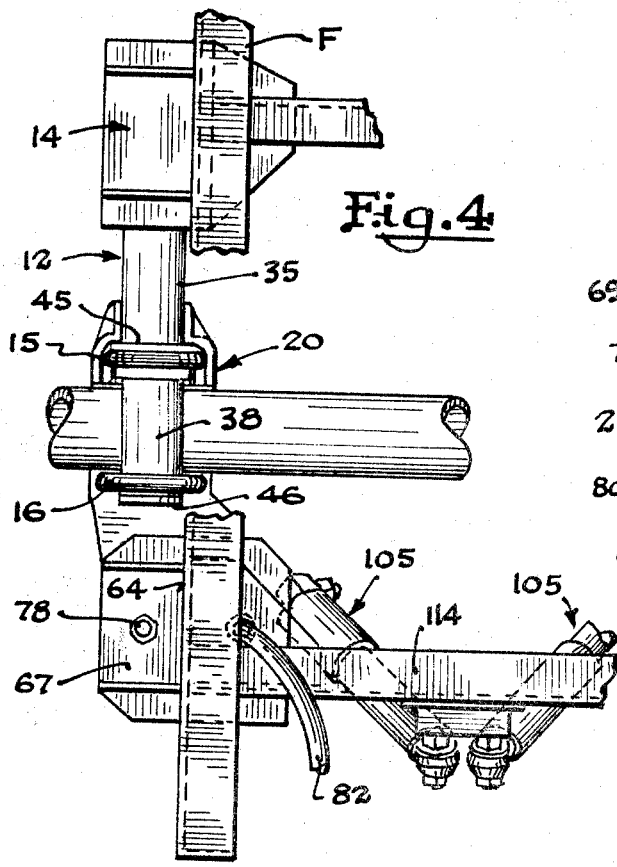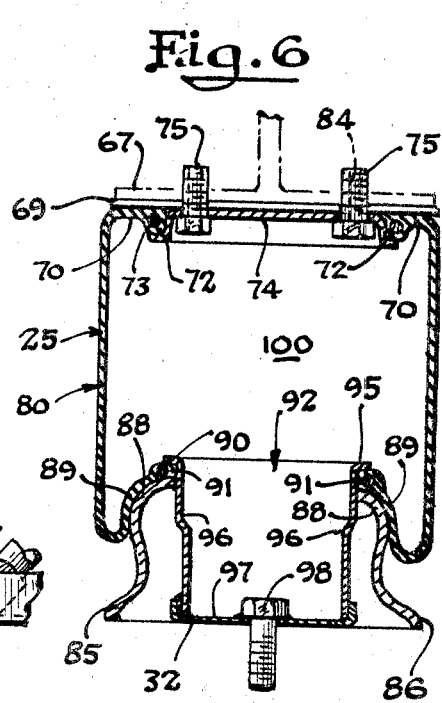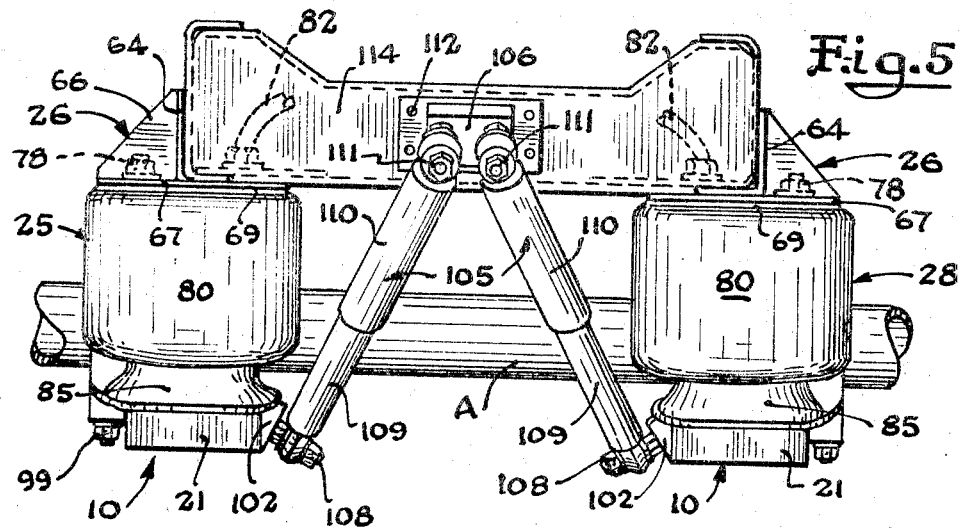

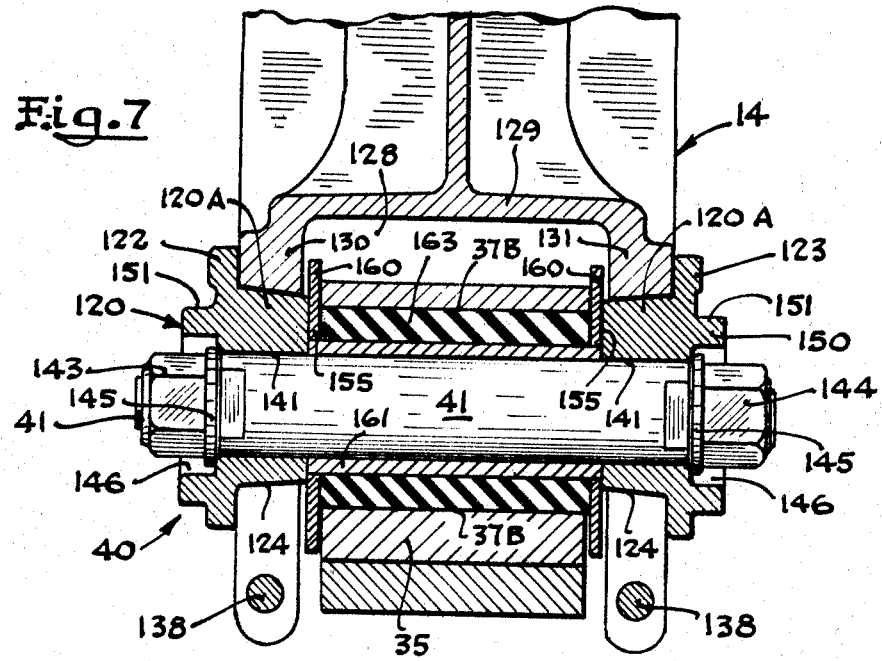
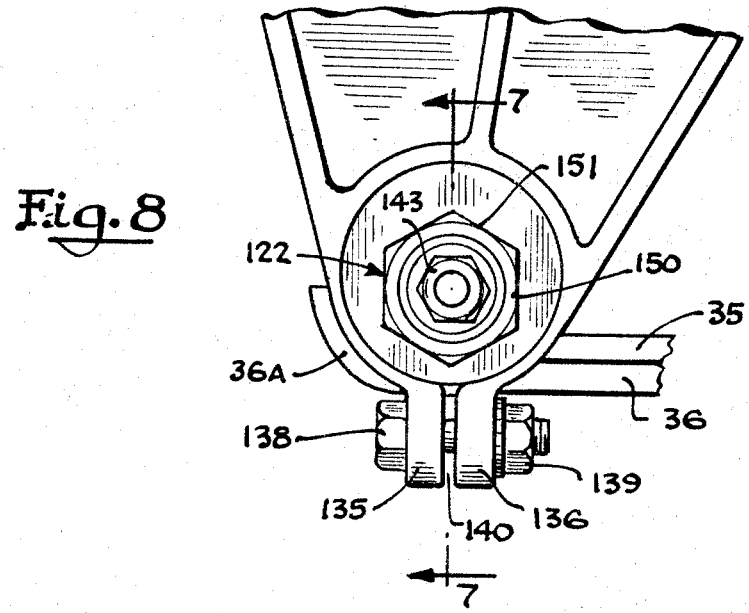

United States Patent Office 3,434,707
Patented Mar. 25, 1969

3,434,707
SUSPENSIONS
John E. Raidel, 2306 Sunset Drive,
Springfield, Mo. 65804
Filed June 2, 1966, Ser. No. 554,762
Int. Cl. B60g 11/46, 11/02; F16f 1/18
U.S. Cl. 267—31                                    5 Claims

ABSTRACT OF THE DISCLOSURE

A vehicle suspension of combined leaf and air springs adjustable for axle alignment. Special clamps for permitting relative sliding movement of leaf springs.

---

The present invention is directed to a suspension for the axles of heavy duty trucks, trailers or the like. More particularly, the present invention is directed to a suspension which employs an expandable container having compressed air therein to dampen the road shocks and motions due to holes, bumps and other surface conditions on roads. The compressed air and the expandable container serve the ultimate purpose of the conventional semi-elliptical spring suspension which is to isolate the load on the truck or trailer body from vibrations and impacts encountered by the wheels. Thus, the present invention employs compressed air and an expandable container to serve in the manner of a spring, and the compressed air and expandable container constitute what is called an "air spring." The primary object of the present invention is to utilize an air spring and a leaf spring in a novel way to achieve advantageous results in a vehicle suspension.

Another object of the present invention is to enable the axle of a vehicle to be suspended by a forward spring member connected to the frame of the vehicle and a rearward air spring connected to the frame of the vehicle whereby said axle is located intermediate said spring member and said air spring for reasons explained hereinafter. A related object is to utilize, for the forward spring, a leaf spring which affords a measure of articulation as well as dampening of road shocks when the air spring rearward of the axle is partially or totally ineffective due to loss of air pressure.

When one of the wheels on the axle moves downwardly into a hole in the road or moves upwardly over a bump, the axle becomes canted and exerts a twisting force on the suspension for the opposite wheel. If not accommodated, this twisting would ordinarily be accompanied by failed parts, especially if such twisting is repeatedly encountered. Accordingly, another object of the invention is to so construct a suspension as to enable twist or torsion at one side of the suspension to be easily absorbed at the other side without resort to special elements therefor in the suspension.

It is important that the axle of a vehicle of the kind herein under consideration be aligned so that the wheels are in alignment without one wheel being forward or rearward of the other. Accordingly, another object of the inventon is to so construct a suspension complying with the foregoing objects as to enable the position of the axle to be easily adapted in a positive manner.

A specific object of the invention is to adjust the position of the axle with an adjustment means including an eccentric associated with a bracket for moving an attached leaf spring member and thereby the axle relative to the frame of the vehicle to establish the aligned position of a wheel carrying axle supported by suspensions having air springs.

Other and further objects of the present invention will be apparent from the following description and claims and are illustrated in the accompanying drawings which, by way of illustration, shows preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is an elevational view of a suspension for wheel carrying axles constructed in accordance with the preferred embodiment of the invention;

FIG. 2 is a side view of a leaf spring member employed in the suspension of FIG. 1;

FIG. 3 is a sectional view taken along the line 3—3 of FIG. 1 in the direction of the arrows showing the axle seat and clamping arrangement;

FIG. 4 is a plan view of a suspension;

FIG. 5 is a rear view of the mounting of the suspensions to the frame;

FIG. 6 is a sectional view of a compressed air container;

FIG. 7 is a sectional view taken along the lines 7—7 of FIG. 8 in the direction of the arrows showing an eccentric for adjusting the position of the suspension relative to the truck body; and FIG. 8 is an enlarged view of the eccentric and bracket.

Referring now to the drawings and more particularly to FIG. 1, there is illustrated a frame F of a trailer or truck body resting on a suspension 10 having an axle A for carrying wheels. The suspension 10 is particularly adapted for the use with heavy duty trucks or trailers which are employed in cross country transportation.

The wheels (not shown) are secured at opposite ends of the axle A which spans opposed suspensions 10 provided at opposite sides of the body frame F. Thus, the weight on the truck frame F is transferred to the suspension 10 and thereby to each of the wheels on opposite sides of said frame F.

The suspension 10 functions to isolate the trailer or truck frame F from road shocks, vibrations or the like caused by the wheels encountering bumps, holes or other surface conditions. Briefly, the suspension 10 includes an axle A which is attached to a forward leaf spring member or spring means 12 and which is also attached to an air spring means 25, which is suitably secured to one side of the frame F. The leaf spring means 12 extends rearwardly from a forward bracket 14 to an axle seat means 20 to which the spring means 12 is clamped by a suitable means including U-straps 15 and 16. Preferably, the axle A is welded to the axle seat member or casting 20, which has a rearward portion 21 disposed beneath an expandable air spring means 25 which is suitably secured to the rearward bracket 26, which is in turn secured to the truck frame F.

An important aspect of the present invention is that the axle A is disposed intermediate the spring means 12 and the resilient air spring means 25, whereby in case of reduced or lost pressure of air in the resilient air spring means 25, the axle A is still suspended for articulation by leaf spring 12.

In the preferred form of the suspension 10, the leaf spring means 12 include one or more leaf spring members such as 35 and 36. The configuration of the leaf spring member 35 can be best understood with reference to FIG. 2, wherein the leaf spring member 35 is shown with a forward spring eye or eye portion 37 and a rearward hook portion 38. The spring eye 37 is secured to the bracket 14 by a securing means 40 which includes a central shaft 41, FIG. 7, disposed through a central opening 37A in the spring eye 37. The lower spring member 36 has a forward curved end 36A, FIGS. 1 and 2, with the curvature complementary to the outside curvature of the spring eye 37 against which it is secured. As seen in FIG. 1, a conventional clamping member 42 secures the spring leaf members 35 and 36 together at their forward ends near the bracket 14.

The leaf spring means 12 is rigidly secured by the U-bolt members 15 and 16 to the axle A and axle seat 20. The preferred manner of accomplishing this rigid securing of the leaf spring means 12 to the axle A is by forming the rearward hook portion 38 with an inside curved surface 44 substantially complementary to that of the exterior surface of the axle A and interlocking the spring member 36 to the axle seat member 20 by means of U-bolt members 15 and 16 and a block member 45, FIGS. 1 and 3. The extreme terminal portion 46 of the leaf spring member 35 is formed with a reverse and upwardly curved portion for receiving the bight of the U-clamp 16. By tightening the opposed nuts 47 on the U-bolt 16, the hook portion 38 of the leaf member 35 may be brought tightly against the upper surface of the axle A.

The U-bolt 16 and clamping block 45 serve to interlock the leaf spring members 35 and 36 to the spring base casting 20 while permitting relative sliding movement between the engaged surfaces 48 and 49 of the respective leaf spring members 35 and 36. The relative sliding of leaf spring members 35 and 36 with flexure is desirable as they each have a different curvature and undergo different changes in length when flexing together. To permit sliding, the clamping block 45 is formed with a pair of spaced legs 50 and a bridging central body portion 51, which when clamped to the axle seat means 20, permits the relative sliding movement along the surfaces 48 and 49 with changes in curvature of the leaf spring members 35 and 36 as they flex with movements of the axle A relative to the frame F.

The legs 50 of the clamping block 45 are received in channels 53, FIG. 3, formed between the outer side walls 54 of the axle seat means 20 and shoulders formed by a central spring seating surface 56 against which the bottom surface of the spring member 36 is engaged. The lengths of the legs 50 are proportioned such that the main body portion 51 of the clamping block 45 bears tightly against the upper surface of the spring member 35 with lower surface of the lower spring member 36 bearing lightly on the spring seat surface 56. Thus, the spring members 35 and 36 are confined on the axle seat 20, but are permitted to slip along their respectively engaged surfaces 48 and 49 with the flexure of the spring means 12.

As seen in FIG. 3, the tightening of the nuts 59 on the U-bolt 15 merely serves to lock clamping block 45 to the axle seat means 20 without tightly binding the spring leaf members 35 and 36 together.

The suspension 10 also functions to tow the axle A and wheels on the axle A. The clamping of the leaf spring means 12 to the axle seat 20 assures this towing. To facilitate this clamping of the spring means 12 to the axle seat means 20, the clamping block 45 has a rearward wall 60, FIG. 1, for engagement with a generally vertical oriented portion 61 of the leaf spring member 35 thereby assisting in the towing of the axle seat means 20 and axle A as a body frame F tows the axle A. Also, it will be appreciated that the spring means 12 is fitted about the axle A to exert a pulling force on the axle particularly with the rear clamp 16 holding the axle A and spring member 35 in engagement.

The load of the frame F is applied to the top of the axle A from the spring means 12 and from the air spring means 25 acting on rearward end 21 of the axle seat means 20. By having the load on top of the axle A, the stress on the clamping bolts 15 and 16 is reduced from a reverse situation wherein the spring means would be disposed on the underside of the axle.

An important aspect of the present invention is that of accommodating the canting of the axle A due to one of the wheels moving vertically relative to the other opposite wheel on the axle A, for example, when only one wheel is encountering a hole or a bump, by means of twisting allowed by the spring means 12.

More particularly, the interlock of the axle A, axle seat 20 and spring means 12 to one another results in the spring means 12 being placed in torsion about the longitudinal axis thereof as twisting or the axle seat 20 tilts upon vertical canting of the axle A about its horizontal axis. Therefore, the need for additional elements for absorbing or accommodating such torsion is eliminated as required in some of the conventional prior art suspensions.

The load on the body frame F is divided so that approximately one-third of the load is transmitted by the bracket 14 to the axle A while the remaining two-thirds is transferred through the resilient air spring means 25 to the axle A.

As stated hereinbefore, the air spring means 25 is secured to the frame F by a bracket 26. The bracket 26 is of generally T-shaped construction with a horizontal plate 67 and a vertical plate 64, FIG. 1, secured by fasteners 65 to the frame F. Preferably, strengthening gussets 66, FIGS. 1 and 5, of triangular shape are secured to the vertical plate 64 and to the generally horizontal plate 67. The plate 26 is disposed in engagement with the upper surface of the air spring means 25 and extends across the air spring means 25, FIG. 6 and bears against an upper rigid plate 69 on the air spring member 25.

The air spring means 25 includes a large main body member 80 of flexible material such as rubber reinforced fabric or other materials. Such flexible materials are commercially available and do not constitute part of this invention. The top portion of resilient body member 80 has a peripheral head 70 in which is disposed a wire-like member 73 for securing about the periphery of a dish-shaped attaching plate 74. The attaching plate 74 is provided with a plurality of threaded studs 75 which extend upwardly through apertures in the plates 68 and 67 whereby threaded nuts 78 can be tightened to secure the air spring means 30 to the bracket 26. Preferably the heads of the threaded studs 75 are welded to the dish-shaped attaching plate 74.

The flexible main body member 80 is held in the configuration illustrated by air under pressure at approximately 100 p.s.i Preferably, the air enters through hoses 82, FIG. 5, which are attached to the studs 75 having central bores 84, FIG. 6, for communication to the force of air pressure which is usually a compressor.

To transfer the load to the axle seat means 20, the lower portion of the resilient main body 80 has a bell-shaped casting 85 which is a rigid metal having a lower annular flange surface 86 disposed in engagement with an inclined flat surface 87 on the rearward portion 21 of the axle seat means 20. On the bell-shaped casting 85 a rounded upper portion 88, FIG. 6, is in engagement with an overlapping and generally rounded and lower portion 89 of the main resilient body 80. A wire-like retainer 90 is formed in a bead 91 of the body member 80. The head 91 and wire retainer 90 encircle an inner attaching bumper 92. The bumper 92 has an upper outwardly turned flange 95 disposed over the retainer 90 to sandwich the bead 91 of the resilient body 80 against the upper portion 88 of the bell-shaped member 85. The bumper 92 is open at the top and has vertical walls 96 extending downwardly to a bottom plate 97 to which are welded bolts 98 having their threaded portions extending downwardly for connection by bolts or by nuts 99 to the flat supporting surface 87 on an axle seat means 20.

The bumper 92 is of metallic, rigid construction and is an air-tight member cooperating with the bell-shaped member 85 to seal the lower portion of the resilient body 80 against the leakage of air from the interior of the flexible body 80. Likewise, the attaching plate 74 in the cooperating upper plate 69 seals the upper portion of the resilient body 80 against the loss of air. Thus, the expandable air spring means 25 affords an air tight chamber 100 within the resilient body 80 from which air under pressure, preferably 100 p.s.i., transfers the load from the body frame F to the axle seat means 20.

With jars and bumps in the road, the air pressure in the resilient body 80 expands or contracts the body 80. The expansion or contraction of the body member 80 dampens shocks and vibrations from the wheels to body frame F. Although it has heretofore been recognized that resilient air spring means afford dampening of the forces and vibrations from the wheels moving over rough roads, the present invention affords the combined dampening of the leaf spring means 12 and the air spring means 25 to afford a desirable ride for the frame F. That is, the spring means 12 and the air spring means 25 have different spring rates which combine to complement one another to provide a smooth ride. More particularly, there is a combining of the more linear deflection of a leaf spring 12 with the more spherical deflection of the air spring means 25.

As can best be seen in FIG. 4, the rearward portion of the axle seat means 20 is offset from the center line CL of the spring means 12. More specifically, the center line CL, as seen in FIG. 4, is leftward of what is approximately the center line of the plate 67 and air spring means 25. The interior and rearward portions of the axle seat means 20 are formed with bosses 102, FIG. 5, for attaching the axle seat means 20 to conventional shock absorbers 105 which are secured at their opposite ends to a bracket 106. The shock absorbers 105 are secured by suitable fasteners 108 at their lower ends to a lower telescoping portion 109 of the shock absorbers 105. The upper and larger diameter portions 110 of the shock absorbers are secured by suitable fastening devices 111 to the bracket 106 which in turn is secured by fasteners 112 to a transverse vertical frame member 114 of the body frame F.

Another important aspect of the present invention is the ability to accomplish a positive adjustment of the axle A in a longitudinal direction relative to frame F in bracket 14 for the purpose of aligning the wheels. The present invention enables such an adjustment to be achieved by means of eccentric means 120, FIG. 7. The eccentric means 120 comprises a pair of eccentric bushings 122 and 123, FIG. 7, disposed in circular openings 124 in the forward bracket 14. The forward bracket 14 has an inner chamber 128, FIG. 7, formed between an upper wall 129 and spaced side walls 130 and 131. As best seen in FIG. 8, the lower portion of each of the walls 130 and 131 of the bracket 14 is formed with spaced jaw portions 135 and 136, which are apertured to receive bolts 138. The tightening of nuts 139 on the bolts 138 draws the jaws 135 and 136 closer to one another to reduce the clearance space 140 therebetween and simultaneously exert clamping forces on the eccentric bushings 122 and 123 to hold the bushings 122 and 123 against turning movement.

The eccentric bushings 122 and 123 each have an interior bore 141 which is sized to accommodate the shaft 41 spanning the bracket 14. The interior bore 141 is offset from the centerline of the tapered, annular projection 125 of the bushings 122 and 123. The opposite ends of the shaft 41 are of reduced diameter and are threaded to receive a pair of opposite nuts 143 and 144 and washers 145. The washers 145 are disposed within a recess 146 formed in a generally hexagonal shape boss 150 having flat sides 151 which can be gripped by a suitable wrench to exert a turning force on the eccentric bushings 122 and 123, respectively.

The interior shouldered ends 155 of the respective eccentric bushings 122 and 123 have annular surfaces for engagement with washer-like spacers 160 encircled on a sleeve 161. The sleeve 161 fits loosely on the shaft 41 and has bonded about its exterior surface a resilient bushing 163 of rubber or elastomeric material. The diameter of the bushing material is selected to fit the spring eyes 37; and is sized so that compression by the spacers 160 on the ends of the housing 163 expands the resilient material to grip tightly the annular interior surface 37B of the spring member 35.

In assembling the securing means 40, the shaft 41 and attached bushings sleeve 161 and resilient bushing 163 is inserted through the spring eye 37 and is disposed in the chamber 128 in the forward bracket 14. After the bushings 122 and 123 are in place, the threaded nuts 143 and 144 are tightened to force the eccentric bushings 122 and 123 toward one another so that their respective opposed interior shoulders 155 force the washers 160 to compress the resilient bushing 163 to expand and to engage tightly against the interior surface 37B, FIG. 2, of the spring eye 37 on the leaf spring member 35. With articulation of the axle A relative to the frame F, the spring means 12 pivots about the shaft 41 and places the resilient bushing materials 163 in torsion relative to its bonded sleeve 161.

When it is desired to align the wheels and axle A, one of the suspensions 10 is selected and its eccentric bushings 122 and 123 are loosened from tight clamping engagement at the surfaces 124 by permitting the jaws 135 and 136 to expand with loosening of nuts 139. The unscrewing of the nuts 143 and 144 frees the bushings 122 and 123 for rotation by a suitable wrench.

As readily apparent from FIG. 7, the upper, cross-sectional thickness of the respective bushings 122 and 123 is greater than the cross-sectional thickness of the lower portions of the bushings. State differently, the bores 141 in the bushings 122 and 123 for receiving the shaft 41 are offset from the centerline of the tapered, annular projections 125 disposed in apertures 124 in the bracket 14. Thus, turning of the eccentric bushings 122 and 123 moves the shaft 41 about the centerline of the projections 125 and of the apertures 124 in the fixed bracket 14. The movement of the shaft 41 also causes a corresponding movement of the attached spring means 12, axle seat 20 and axle A.

The adjustment of the shaft 41 in the horizontal direction relative to the fixed bracket 14 and frame F results in shifting of the axle A to align a wheel on one end of the axle A with the wheel on the opposite end of the axle A. After such a suitable adjustment, the nuts 143 and 144 are tightened on the shaft 41 to hold the eccentric bushings 122 and 123 against turning in the bracket 14. Also, the tightening of nuts 139 and the bolts 138 causes the jaws 135 and 136 to clamp tightly the bushings at the supporting surfaces 124.

From the foregoing, it will be seen that the present invention affords a suspension characterized by relatively few and unique elements cooperating to constitute a suspension. The ride characteristics afforded by the present invention are from the combined characteristics of a leaf spring means and a resilient air spring means. The air suspension has a torsion characteristic uniquely afforded by the manner of securing the leaf spring members to the axle. Also, the suspension includes a positive and effective adjustment of the axle A to align the wheels or an axle.

Hence, while preferred embodiments of the invention have been described and illustrated, it is to be understood that these are capable of variation and modification.

I claim:

1. In a suspension for trailers or the like vehicles wherein an axle is mounted for movement relative to the frame of the vehicle supported thereby, bracket means adapted to be secured to said frame, elongated spring means having a forward end secured to said bracket means, axle seat means secured to said spring means rearward of said bracket means, rearwardly extending means secured to said rearwardly extending means, said air spring means being adapted to be connected to said frame, means to clamp said axle to said axle seat means so that said axle will be suspended intermediate said air spring means and said bracket means for articulation relative to said frame, securing means including an eccentric for securing said elongated spring means to said bracket means, a loop at one end of the elongated spring means surrounding the eccentric, said eccentric means being rotatable to move said elongated spring means and said axle seat means relative to said frame for the purpose of aligning said axle, means to lock the eccentric in a selected rotational position.

2. The suspension of claim 1 including substantially non-yieldable bumper means adapted to be disposed between said frame and said rearwardly extending means whereby, with loss of air pressure in said air spring means, the bumper means will cause the axle to remain suspended by said elongated spring means.

3. The suspension of claim 1 wherein said eccentric means includes a pair of oppositely disposed bushings, said bracket means having oppositely disposed seats for said bushings, shaft means extending between the bushings, a resilient sleeve surrounding the shaft means and the said loop of the spring means surrounding the resilient sleeve, whereby flexure of the elongated spring means is yieldably resisted by torsion in the resilient sleeve, and said bushings having central apertures for receiving said shaft means, the bracket means having openings for receiving the pair of oppositely disposed bushings, the bushings and openings having complementary wedge surfaces, the locking means comprising means to reduce the areas of the openings which receive the bushings.

4. The suspension of claim 1 wherein said elongated spring means includes a plurality of leaf spring members, one of said leaf spring members having a forward portion for connection to said bracket means, a rearward portion on said one leaf spring member curved to fit about the upper surface of said axle, a reversely curved end section on the said one leaf spring member adjoint the said rearward portion, said axle seat means having a portion to receive at least said one leaf spring member, and said leaf spring members being free to slide relative to one another during flexure thereof, a clamp engaging the reversely curved section and another clamp engaging the said one leaf spring member adjacent the said rearward portion opposite the reversely curved section, means to tighten the clamps to the axle seat means.

5. The suspension of claim 4 wherein the clamps comprise U-bolts and the means to tighten the clamps to the axle seat means comprises fasteners for the legs of each U-bolt, a channel member having legs on opposite sides of a central span, recesses in the axle seat means for receiving the legs of the channel member, the axle seat means having base surfaces at the bottoms of the recesses against which the legs of the channel member rest, the leaf spring members extending between the legs of the channel member and between the axle seat means and the central span of the channel member, whereby the legs of the channel member provide stops against binding together of the leaf spring members when the U-bolt is tightened.

References Cited

UNITED STATES PATENTS

| 3,233,915 | 2/1966 | Hamlet | 267—18 |
| 3,237,957 | 3/1966 | Harbers | 267—31 |

FOREIGN PATENTS

| 335,116 | 11/1929 | Great Britain. |
| 360,877 | 5/1930 | Great Britain. |

ARTHUR L. LA POINT, *Primary Examiner.*

U.S. Cl. X.R.

267—54; 280—124